United States Patent Office 3,520,790
Patented July 14, 1970

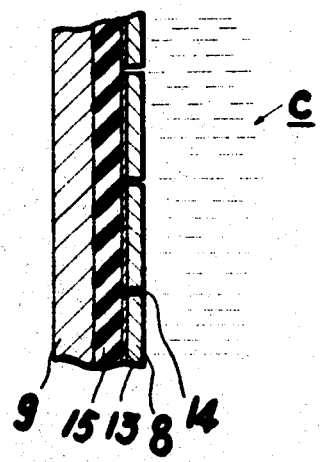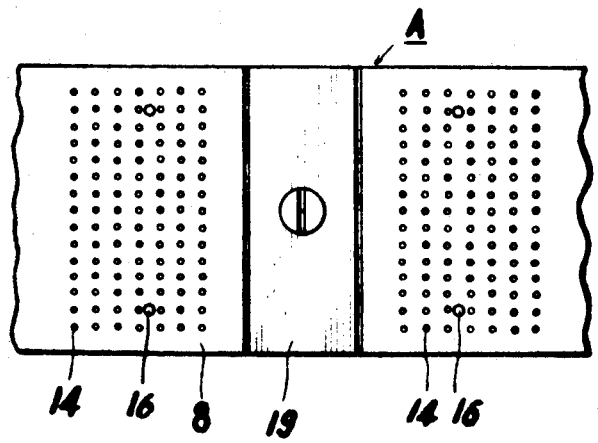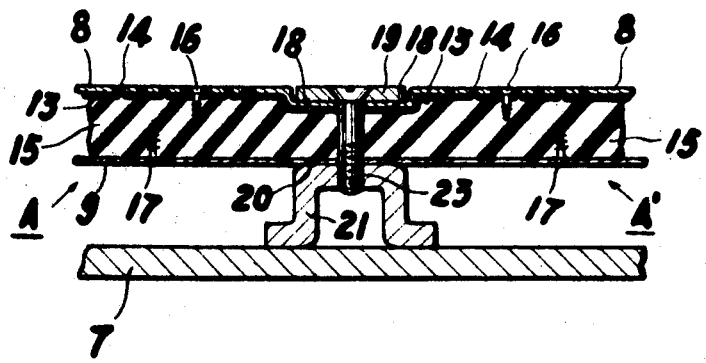

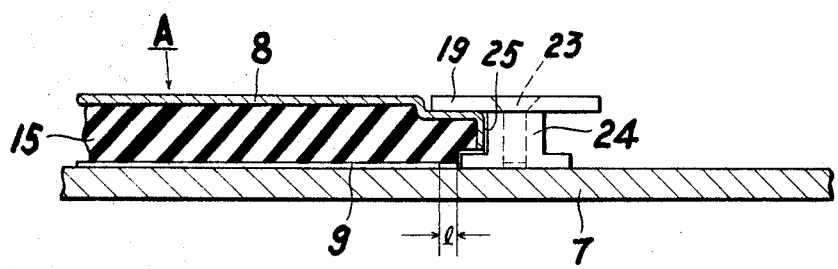
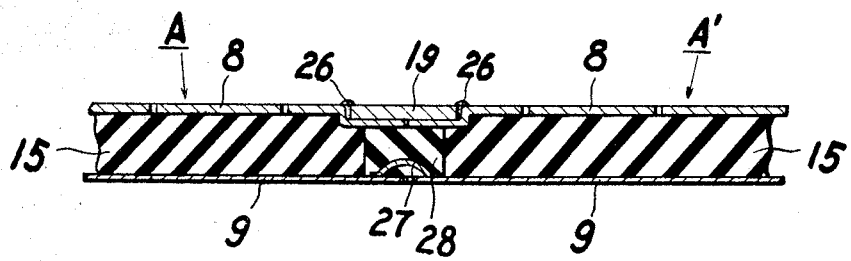
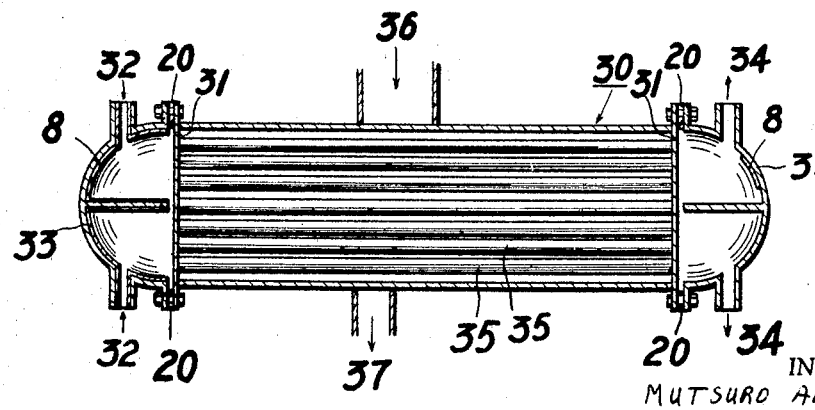

3,520,790
DEVICE FOR PREVENTING MARINE CREATURES FROM STICKING
Mutsuro Araki and Sotojiro Hamada, Yokohama-shi, Japan, assignors to Nippon Kokan Kabushiki Kaisha, Tokyo, Japan
Filed Aug. 2, 1966, Ser. No. 569,667
Int. Cl. C23f *13/00;* F28f *13/00*
U.S. Cl. 204—196         1 Claim

ABSTRACT OF THE DISCLOSURE

A device for preventing clinging of marine creatures to the inner surface of a sea water conduit. An electrode assembly is situated in the conduit adjacent to the surface thereof to which marine creatures are not to cling. An electrical circuit coacts with this electrode assembly to generate from ions which dissolve in the sea water and inhibit the clinging of the marine creatures to the surface of the conduit, and a suitable mounting structure is provided for mounting the electrode assembly on the inner surface of the sea water conduit.

---

The present invention relates to a method and device for preventing marine creatures from sticking on inner wall surfaces of open or closed conduits and pipes for transportation of sea water or for heat exchanger using sea water.

In seaside industrial areas sea water is utilized as a cooling medium which can be used industrially at low cost, but it poses a serious problem in that it lowers the flow rate or blocks heat exchangers due to sticking and growing of marine creatures on the inner wall surfaces of closed or open conduits or transportation pipes extending from sea water intakes to heat exchangers. As for the method for preventing the same, it has been proposed to blow chlorine gas into the introduced sea water at a rate of 2–5 p.p.m. However, since much of the said gas is consumed by reductive substances which are included abundantly in the sea water, there is a disadvantageous result in that a considerable cost is required for adopting this cooling method in which the quantity of sea water used amounts to 1000–2000 tons per hour.

It has long been attempted to obtain organic metal compounds, organic poison and the painting thereof, the object of which is to obtain a cleaning effect by poisons gradually dissolving or eluting from a painted film, coated on inner wall surfaces of transportation pipes with poison-containing paint such as cuprous oxide, mercury, etc., which are known long since as bottom paint for cleaning, but the copper content in the painted film is 20–30% at the most, for example.

It has been found that the quantity of copper to be dissolved for maintaining the cleaning or anti-stain property for the coated film is about 0.3–0.5 mg./cm.$^2$/month, and the useful period or life of the cleaning or anti-stain paint is limited only to 1.5 or 2 years.

Accordingly, this method or coating poison is only effective and appropriate for ships which can be treated with maintenance coating at repairs in docking of ships, but with transportation pipe for cooling water, which has little chance for such treatment, although a certain degree of elongation of useful life may be obtained, the useful life may be only a year or two, and each time it is required to carry out the troublesome coating operation which requires to stop the sea water transportation system. Moreover, this method has a disadvantage in that the operation can only be effected when the coating operation is possible. Furthermore, taking an example of barnacles, their growing season is from May to October, and none of them stick anew from about November to April. In the case of painting, the dissolving or eluting quantity of poison cannot be controlled according to necessity, so that the poison elutes unnecessarily and the effective period is shortened. Many other methods have been adopted or developed, but none of them have attained an industrial usefulness.

The present invention, considering the above, avoids the disadvantages of the conventional expedients by providing a copper anode and a cathode inside the sea water transportation pipe, passing an electric current therethrough so as to deposit or elute copper ions onto the inner wall surface of the pipe, and by this means preventing the sticking and growing of newly deposited marine creatures so that the sea water can be utilized as industrial cooling water at low cost.

As for the cathode, it is easiest to use iron, but non-consuming electrodes such as magnetic iron oxide or carbon may also be used. The new deposits of marine creatures such as barnacles or mussels stick and grow on the wall surface inside the closed or open conduits or transportation pipe which extend over a long distance from the intake of sea water to the heat exchanger, causing a decrease in the flow rate, and a portion of the marine creatures peel off and enter into the transportation pipe, which has a small diameter and in which the velocity of water current is large, and they are pressed in front of the heat exchanger by water pressure, thus creating the problem of preventing accidents.

These new young marine creatures cannot stick or grow in transportation pipe having a small diameter and current velocities of more than 1–1.5 m./sec. The area most easy to stick to is that of the inner wall surface of concrete conduits where the current velocity is low because the diameter is made large for introducing sea water. Therefore, according to the present invention, by preventing the marine creatures, which were entrained into the water current, from sticking and growing at this inner wall surface, the problems of lowering of said flow-rate and blocking of the heat exchanger may be prevented to a greater extent than before.

According to the present invention, in order to prevent the sticking of marine creatures, copper ions are eluted or deposited especially on the inner wall surface and near the portion of both electrodes from a copper anode provided inside the closed or open conduits, so that it is more efficient than the conventional method of blowing chlorine gas into sea water. Moreover, in contrast to conventional coating methods in which the dissolving of poison cannot be controlled, with the method according to the present invention, the extent of dissolving or elution may be controlled freely, a factor which is of great industrial utility.

The invention is illustrated by way of examples in the accompanying drawings which form part of this application and in which:

FIG. 3 is a sectional view of a copper anode used in the method according to the present invention;

FIG. 4 is a plan view of a panel type of copper anode plate;

FIG. 5 is a sectional view showing a manner in which panel type copper anode plate shown in FIG. 4 is fixed on the conduit wall;

FIG. 6 is a sectional view of a joint portion of a panel for a copper anode of a rail-fitting type;

FIG. 7 is a sectional view of an electrical connection for panel type copper anode plate; and FIG. 8 is a sectional view of an example where the present invention is applied to a heat exchanger.

EXAMPLE 1

Figure 1:
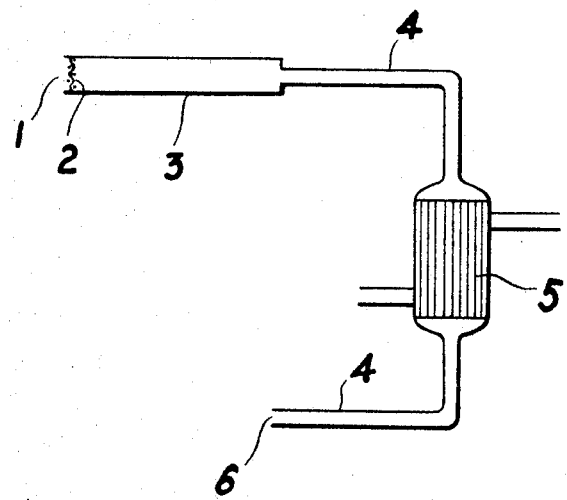
FIG. 1 shows a cooling system of sea water transportation.
Figure 2:
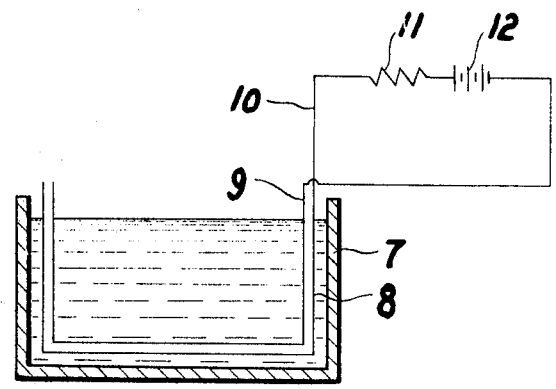
FIG. 2 is an explanatory diagram, in section, of an open conduit provided with an example according to the present invention.

FIG. 1 shows an example in which sea water is utilized for a cooling system. The systematic diagram shows that sea water is introduced into closed or open conduit 3, made of concrete, a sea water from intake 1, passing through a screen 2, and into a heat exchanger 5 through a transportation pipe 4, made of copper, and discharged from a sea water exhaust port 6. FIG. 2 is a cross section of an open conduit having a concrete wall 7, a copper netting or copper anode 8 being provided near said wall surface 7, and FIG. 2 also shows a cathode 9 made of iron, said anode 8 being connected to a D.C. source 12 through lead wires 10 and resistor 11.

When an electric current is passed through the circuit from the D.C. source 12, copper ions are dissolved or eluted from copper anode 8 into water adjacent the wall surface 7, so that marine creatures in sea water flowing into the open conduit flow out through the transportation pipe without sticking or growing on the wall surface. In this case the quantity of copper ions eluted may be controlled at will by changing the voltage at the external source 12 or the resistor 11 which control the dissolving of the copper electrode. In accordance with the seasonal change of the marine creatures, during the seasons when no marine creatures stick, the supply of the electric current is interrupted, or the lead wire 10 may be switched to the cathode side, so that the dissolutions of the copper anode 8 is suspended, and there will be no unnecessary consumption of the electrode, and, at the same time, corrosion of the surface by sea water can be prevented, so that the life of the device can be extended. Thus, when net-formed electrode is used for both anode and cathode the mesh of the cathode netting is larger and the wire thicker as compared with those of the anode. In some case, it is also possible to utilize the reinforcing iron wire inside the concrete 7.

Copper ions may elute all over the conduit, but the distinction of the present invention with respect to the injection of chlorine gas is that thicker or denser copper ions are caused to elute on the inner wall surface at a predetermined vicinity thereof, and the poisonous effect thereof is always constant and not proportional to the quantity of sea water. Furthermore, in contrast with conventional methods of poison coating, not only is the effective life longer, but renewing operations are performed more easily, without interrupting the introduction of sea water.

FIG. 3 is a sectional view of a copper anode plate. The copper anode 8 and the iron cathode 9 are disposed, as shown in the drawing, with mortar layer 13 therebetween, said copper anode 8 being provided with appropriate through holes 14, and an insulating layer 15 is formed on the rear surface of the anode in contact with mortar layer 13.

EXAMPLE 2

FIG. 4 shows a construction of a copper anode plate of a panel according to the present invention, which is made of a copper plate 8 which is 3000 mm. long, 1000 mm. wide, and 0.5–1.0 mm. thick, for example, provided with epoxy paint layer, of coal tar group, on its rear plate, and the whole surface is formed with perforations 14 having a diameter of 2 mm. and distance between centers of about 30 mm. Though these perforations 14 water is made to pass to a base plate 13 made of mortar or asbesto cement attached to the rear surface of the plate. Furthermore, screw holes 16 are provided for holding this panel to the concrete wall surface of conduits at desired positions taking the speed of water current in the conduit in consideration. As may be seen from FIG. 5, an intermediate insulating layer 15 is provided in the panel and receives the screws 16. The fixing of copper plate 8 and cathode material 9, which may take the form of metal lath, crimped wire nets, iron plates, are effected by means of fixing members 17 joining material 9 to insulating layer 15 having a suitable insulating properties, so that the copper plate 8 which is the anode and the cathode material 9 will not be short-circuited.

To secure successive panels on the conduit, both of the successive panels A, A' are abutted at their ends as shown in FIG. 5, and at this abutted portion, a holding plate 19 is placed in recessed portion 18 formed conveniently in the abutted portion. Also at the cathode material 9, an insulating member 20 is provided. Screw 23 fixes abutting frames A, A' to member 21 secured to the concrete wall 7 of the water conduit.

EXAMPLE 3

In FIG. 6 is shown another mounting method using a rail member according to the present invention. Thus panel A is fitted into a fitting groove 25 constituted by securing a holding plate 19 on a rail base 24 fixed on the concrete wall 7 with bolt 23. In this case, an appropriate gap is formed between the edge portion of panel A and said rail base 24, and also a sufficient spacing 1 is maintained between the cathode material 9 and the rail base 24. In any of the above-described means, an appropriate insulation is provided between both of the electrode plates 8, 9 of each panel and the fixing bolts or the rail base. The anode and the cathode of each panel A, A' thus formed are electrically connected respectively as shown in FIG. 7. The anode copper plates 8, 8 thus secured are connected, between fixing means 23, with holding plate 19 by means of welding or brazing 26, 26. A lead wire 27 is connected between cathodes 9, 9, and the gap between the anode and the cathode portions is filled with a sealing material 28 of synthetic rubber so as to prevent both electrodes from being electrically contacted. From the uppermost portions of the panels A thus provided, a bus coated with insulating material and an arc bus are led out to be fed from an electric source.

In this way, with the device according to the present invention, the panel A is obtained by providing the copper plate 8 and the cathode material 9 on both sides of the base or insulating plate 15 made of mortar or asbesto cement, and the panel is fixed onto the wall surface 7 of the water conduit by means of the holding plate 19 in connection with the element 21 or the rail base 24. Thus the device for preventing sticking of marine creatures may be attached easily on any part of a water conduit either newly installed or already before, and without requiring a large quantity of material such as cement, gravel or sand for the installation. The mounting operations can be completed within a shorter period. Furthermore it is easy to repair the device of the invention if some fault occurs.

EXAMPLE 4

FIG. 8 shows a cross-sectional view of the device according to the present invention when it is applied to a heat exchanger. On both sides of the body casing 30 are covers 33, one having sea water inlets 32, 32 and the other having sea water outlets 34, 34. Sea water is introduced from the inlets 32, 32 to the tubes 35 of the heat exchanger and discharged through the sea water outlet. One side of the body casing 30 is provided with an inlet opening 36 for feeding steam or a liquid, and on the other side of the body casing as oppositely provided with outlet opening 37 (a drain outlet in the case where steam is used). In this way the heat exchange is carried out between the steam or liquid and the sea water running through the heat-exchanging tubes 35. For example steam fed from the inlet opening 36 is cooled and drained from the outlet opening 37. In such a heat exchanger, according to the present invention, the inner surface of each cover 33 is provided with a copper plate 8, and an insulating material 20 is inserted at the connecting portion (flange portion) between the body casing 30 and each cover 33.

The copper plate 8 may of course be extended all over the entire inner surface of each cover 33, but in some case the copper plate 8 can be fitted only a part of the inner surface of the cover. The method of providing the plate may be plating, cladding, or by use of adhesives of an epoxy group. In a particular case, the copper plate 8 may be a netting, or all of the cover be made of copper. With such a formation, according to the present invention, an electric source is connected between each cover 33 and the tube plate or heat exchanging tubes 35, and an electric current having a relatively small density sufficient to elute the copper ions necessary for cleaning or preventing pollution is caused to pass therethrough for electrolysing the copper plate 8. By means of such Cu ions, the pollution due to the sticking of marine creatures or other harmful deposits can be prevented and the loss due to the elution of tube plates or tubes of the heat exchanger may be suppressed.

In the above described examples, the same effect and advantage may be obtained when a closed conduit is used for introduction of sea water as in the case of the open conduits. Also in the above mentioned examples, a netting material is mentioned as used for the copper electrode, but the present invention is not limited thereto, and wire-formed, plate-formed, or perforated plate can also be used with the same effect and the advantage.

As described above, with the method according to the present invention, the problems prevailing now on the use of sea water for cooling due to the sticking of marine creatures are substantially lessened, thus provided a method which is useful in its industrial applications. The method has also a wider range of application, a method for preventing sticking of marine creatures in the treatment of seaside industrial water, or for water power stations using sea water.

What is claimed is:

1. In a heat exchanger, a body casing having heat exchanging tubes and cover means having fluid openings, said body casing and said cover means being electrically insulated from each other and a copper element forming part of said cover means to generate copper ions by passing of an electric current from an appropriate electric source with the copper element as anode.

References Cited

UNITED STATES PATENTS

| | | | |
|---|---|---|---|
| 392,736 | 11/1888 | Kotyra | 204—196 |
| 843,357 | 2/1907 | Partee et al. | 204—147 |
| 1,020,480 | 3/1912 | Cumberland | 204—196 |
| 1,281,108 | 10/1918 | Vaughn | 204—196 |
| 2,762,767 | 9/1956 | Mosher et al. | 204—147 |
| 2,784,156 | 3/1957 | Maurin | 204—147 |
| 3,010,886 | 11/1961 | Chappel | 204—149 |
| 3,102,085 | 8/1963 | Edwards et al. | |
| 3,241,512 | 3/1966 | Green | 204—147 |

FOREIGN PATENTS 823,531  11/1959  Great Britain.

TA-HSUNG TUNG, Primary Examiner

U.S. Cl. X.R.

165—134, 157; 204—147, 280, 284, 286, 149